United States Patent [19]

Moore

[11] Patent Number: 4,871,285
[45] Date of Patent: Oct. 3, 1989

[54] CYLINDER BORING APPARATUS AND METHOD

[76] Inventor: John W. Moore, 206 York Ln., Yorktown, Va. 23690

[21] Appl. No.: 225,485

[22] Filed: Jul. 28, 1988

[51] Int. Cl.⁴ .............................................. B23B 41/12
[52] U.S. Cl. .................................. 408/80; 408/72 R; 408/115 R; 408/709
[58] Field of Search ..................... 408/72 R, 72 B, 79, 408/80, 88, 115 R, 115 B, 708, 709

[56] References Cited

U.S. PATENT DOCUMENTS

| | | | |
|---|---|---|---|
| 275,102 | 4/1883 | Wild | 408/709 X |
| 349,963 | 9/1886 | Watson et al. | 408/709 X |
| 1,097,318 | 5/1914 | Heiser | 408/709 X |
| 1,187,992 | 6/1916 | Heiser | 408/709 X |
| 1,373,856 | 4/1921 | Bosch | 408/709 X |
| 1,438,316 | 12/1922 | Krejci | 408/709 X |
| 1,745,207 | 1/1930 | Davis et al. | 408/709 X |
| 1,814,920 | 7/1931 | Hartwell | 408/709 X |
| 2,103,294 | 12/1937 | Michener | 408/709 X |
| 2,230,639 | 2/1941 | Calcagni | 408/709 X |
| 2,645,139 | 7/1953 | Beauloye et al. | 408/72 R |
| 2,651,221 | 9/1953 | Foster | 408/708 X |
| 2,964,978 | 12/1960 | Alafouzos | 408/79 |
| 2,986,050 | 5/1961 | Wolf | 408/709 X |
| 3,331,266 | 7/1967 | Brooks | 408/709 X |
| 4,234,275 | 11/1980 | Clement | 408/709 X |
| 4,730,958 | 3/1988 | Banoczky | 408/708 X |

*Primary Examiner*—Steven C. Bishop

[57] ABSTRACT

Apparatus is provided for re-boring the cylinder of a single cylinder engine. The apparatus comprises upper and lower alignment components accurately positionable upon the axis of the cylinder by interaction with fixed features of the engine. The alignment components retain the bar or shaft of a rotating cutting tool.

6 Claims, 4 Drawing Sheets

CYLINDER BORING APPARATUS AND METHOD

BACKGROUND OF THE INVENTION

This invention relates to the renovation of conventional internal combustion engines, and more particularly concerns the restoration of worn cylinders of small single cylinder internal combustion engines.

Conventional piston driven internal combustion engines are characterized by having one or more pistons which travel in reciprocal motion within an equal number of cylinders. As the engine experiences wear through normal usage, the cylinder walls become scored or eroded by friction and heat created by contact with the pistons. Such wear may create a cylinder which is tapered or out-of-round. In either case, compression rings carried by the piston will fail to completely contact the cylinder wall during the entire stroke of the piston's travel. This condition results in the loss of the cylinder's ability to adequately compress an ignitable mixture of gasses, and thereby renders the engine less powerful. It is common practice in engine rebuilding to re-bore each cylinder which is worn beyond certain limits to an oversize diameter and to install oversized pistons. The re-boring process requires precise alignment of a cutting tool upon the axis of each cylinder and precise cutting of metal from the cylinder wall.

Various re-boring devices are shown in the prior art. Most such re-boring devices are cumbersome and expensive, and require specialized skills for proper operation. Certain re-boring devices are disclosed in the prior art which require a minimum of two parallel cylinders in order to achieve alignment of the device on the cylinder axis and are, therefore, impractical for re-boring small one cylinder engines. Additionally, re-boring devices have been disclosed which use only the engine block's deck and cylinder for alignment. In practice, such re-boring devices are not capable of maintaining perfect alignment of the cylinder axis during the boring process. Furthermore, most re-boring devices are incapable of maintaining alignment on the cylinder axis when removed for inspection of the bore. Each time the boring device is removed and replaced, re-alignment is necessary. Moreover, most re-boring devices are mechanical cutting tool feed apparatus which are expensive to precisely manufacture with the requisite precision, and are difficult to use because of their cumbersome size. Other devices have no feed mechanism at all and are incapable of controlling accurate cutting of the cylinder walls.

It is therefore an object of the present invention to provide an engine cylinder re-boring apparatus which is small and inexpensive.

It is another object of this invention to provide an engine re-boring apparatus which may be used without specialized machine skills.

It is a further object of the present invention to provide a re-boring apparatus of the aforesaid nature capable of accurately and consistently re-boring engine cylinders on original axes, particularly in engines having one cylinder.

It is a still further object to provide an apparatus of the aforesaid nature which may be inexpensively manufactured and is economically feasible for small engine repair shops to own and operate.

It is yet another object of this invention to provide an engine cylinder re-boring apparatus which may be adapted for use with a myriad of different engines.

These objects and other objects and advantages of the invention will be apparent from the following description.

SUMMARY OF THE INVENTION

The above and other beneficial objects and advantages are accomplished in accordance with the present invention by an engine cylinder reboring apparatus adapted for use on a conventional piston driven internal combustion engine having a block, deck, cylinder, crankshaft bearing, cylinder head bolt holes, crankcase and crankcase gasket surface, said apparatus comprising in general upper and lower alignment means accurately positionable upon the axis of the cylinder by interaction with fixed features of the engine, said alignment means serving to retain the shaft of a rotating cutting tool.

In greater specificity, the apparatus comprises:

(a) an alignement plate having upper and lower surfaces and a circular aperture communicating between said upper and lower surfaces and having between three and five counterbored holes and head attachment means spaced about said aperture, said alignment plate being adapted for attachment to said deck in a manner disposing said aperture in coaxial alignment with said cylinder.

(b) boring head means having a centered rotatable cylindrical bar in coaxial alignment with said circular aperture, said bar having lower and upper extremities, said lower extremity disposed below said aperture, said upper extremity being associated with means for rotating said bar and downwardly advancing said bar proportionally with respect to rotational movement thereof, said boring head means being positioned by engagement with said head attachment means, (c) a lower support assembly comprising:
 (1) a bearing block having front and rear extremities and a bore adapted to rotatively secure said bar adjacent its lower extremity,
 (2) front and rear cylindrical support shafts fixedly held by said front and rear extremities, respectively, said shafts being perpendicularly disposed to the axis of said bore and having distal extremities provided with lateral positioning means, the distal extremity of said rear shaft being adapted to penetrate said crankshaft bearing in close-fitting engagement therewith, and
 (3) a side support plate having front and rear surfaces and a circular opening permitting close-fitting passage of said front shaft, said rear surface being flat and adapted to abut against the gasket-receiving surface of the crankshaft, and clamping means associated with said front surface for securing said front shaft and thereby preventing movement of said bearing block, (d) a circular centering plug having a centered cylindrical channel, upper and lower surfaces and at least one inwardly recessed annular abutment shoulder defining coaxial cylindric sectors having different diameters, a first of said sectors being adapted for insertion into said cylinder in close cicumferential conformity with the wall of the cylinder, the associated abutment shoulder being adapted to define a lower limit of insertion upon contact with said deck, and a second sector disposed above said first sector and of larger diameter and adapted to accept the circular aperture of said alignment plate in close circumferential conformity, thereby coaxially aligning said circular aperture and engine cylinder, (e) an alignment shaft adapted to extend in close-fitting passage through the channel of said centering plug and the bore of said bearing block, and (f) cutting means extending radially from said boring bar and axially positionable thereupon, and adapted to cut the cylinder wall in a rotational spiral manner.

In preferred embodiments, the alignment plate may be associated with the deck by means of eccentric washers being held in suitable recesses of said counterbored holes, thereby allowing controlled orientation of said plate with respect to said cylinder head bolt holes and further allowing the adaptation of said plate to a variety of engines with various arrays of head bolt holes.

The boring head means may have means for releasing the bar from the proportional rotational mobility, thereby allowing the bar to be raised or lowered independently of rotational movement.

In a preferred embodiment, the bore of the bearing block is lined with a replaceable soft metal bearing adapted to accept the bar in close conformity, thereby reducing friction between the bar and the bearing block. Such construction further permits use of interchangeable bearings, some of which may provide a non-centered bore that may be found useful in certain instances.

In another preferred embodiment, the lateral positioning means may be threaded to facilitate precise adjustment of said bearing block laterally with respect to the axis of the engine cylinder.

The side support plate may be provided with a variety of slots and holes adapted to facilitate attachment of the plate to a variety of engines.

The centering plug may be fashioned from a resilient yet dimensionally stable material such as an engineering grade plastic which may contain a dimension-stabilizing filler. The centering plug may be comprised of a number of cylindrical sectors, thereby adapting the plug for usage in various diameter engine cylinders.

The boring bar may have an adjustable limiting means associated with its upper extremity to define a limit of penetration of the cutting means into the cylinder.

In the method of the present invention, the re-boring of a conventional piston driven internal combustion engine is accomplished using an embodiment of the apparatus of the present invention in the following steps:

(a) The engine is disassembled and the block is thoroughly cleaned.

(b) The diameter of the cylinder wall is measured, and an appropriately sized centering plug is selected.

(c) The centering plug is inserted into the opening of the cylinder until the abutment shoulder makes contact with the deck.

(d) The alignment plate is centered around the plug and secured to the deck.

(e) The length of the cylinder wall is measured, and a depth limiting clamp is appropriately secured adjacent the upper extremity of the bar. Also, the cutting means is positioned upon the bar so that the distance thereupon to the lower extremity of the bar is greater than the length of the cylinder.

(f) The lower support assembly is installed, making use of the crankshaft bearing of the engine, and secured by said threaded positioning means.

(g) The side plate is installed loosely over the front support shaft, then secured to the crankcase gasket surface.

(h) Once secured, the lateral positioning means is permitted to release the bearing block, allowing limited longitudinal and rotational movement.

(i) The alignment shaft is inserted through the channel of the centering plug, through the bore of the bearing block.

(j) Once alignment is achieved, the lower support assembly is secured using the clamping means associated with said plate, and said lateral postioning means.

(k) The alignment shaft and centering plug are removed.

(l) With the cutting means secured to the boring bar at proper height, the boring head is positioned upon the alignment plate and secured thereto by engagement with said head attachment means.

(m) The rotational means is installed upon the upper extremity of the boring bar.

(n) The cylinder is sprayed liberally with cutting oil.

(o) The rotational means is started. The boring operation is completed when the depth limiting means contacts the deck of the engine.

(p) With the boring head removed, the cylinder wall is examined to insure that a uniform diameter has been achieved. If not, a larger diameter cutting means is installed upon the bar and the process is repeated until the cylinder wall is free of imperfections.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
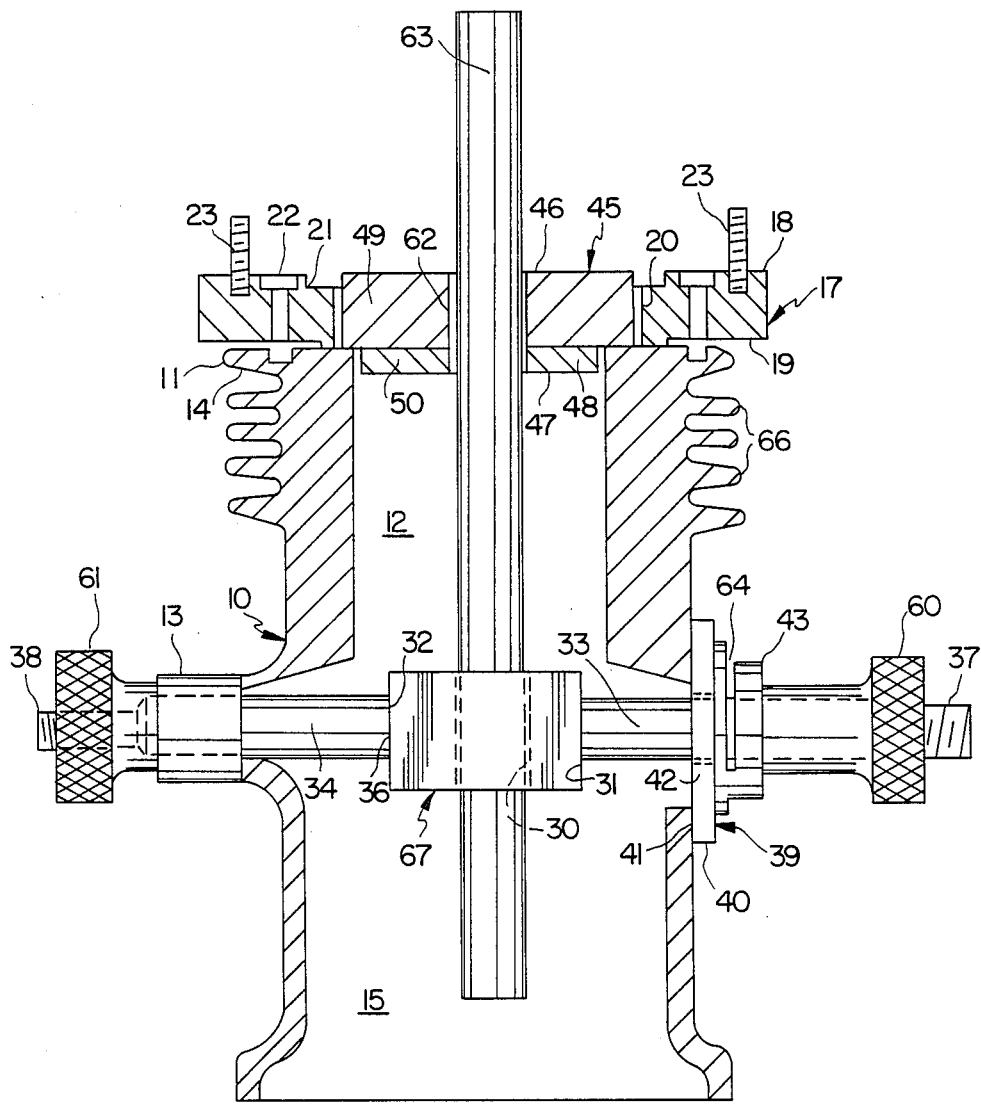
FIG. 1 is a side view showing embodiments of certain components of the apparatus of the present invention, illustrated partly in section and in functional association with an engine.

Referring to FIGS. 1-5, an embodiment of the apparatus of the present invention is shown in operative relationship with a conventional single cylinder piston driven internal combustion engine having a block 10, deck 11, cylinder 12 having annular cooling vanes 66, crankshaft bearing 13 which accommodates a crankshaft (not shown), cylinder head bolt holes 14, crankcase 15, and crankcase gasket surface 16.

The apparatus is comprised in general of boring head means 24, alignment plate 17, centering plug 45, and lower support assembly 29. Alignment plate 17 has upper and lower surfaces 18 and 19, respectively, and a circular aperture 20 communicating between said upper and lower surfaces. The aperture has an annular abutment shoulder 21 recessed downwardly from the upper surface. The plate has between three and five counterbored holes 22, and head attachment means in the form of threaded studs 23 upwardly emergent from surface 18 and spaced in equal array about aperture 20. Alignment plate 17 is adapted for attachment to deck 11 in a manner disposing aperture 20 in coaxial alignment with cylinder 12. Boring head means 24, having a rotatable cylindrical bar 25, is disposed above plate 17. Bar 25, having lower and upper extremities 26 and 27 respectively, penetrates aperture 20 in coaxial alignment therewith, said lower extremity being disposed below plate 17. Upper extremity 27 of the bar is associated with means for rotating said bar such as electric drill 28 and means for downwardly advancing said bar proportionally with respect to rotational movement of said bar. The boring head means 24 engages studs 23 by way of mounting base 58, and is secured by nuts 69.

Lower support assembly 29 is comprised of bearing block 67 having a cylindrical bearing bore 30 adapted to accept lower extremity 26 of the bearing bar in close conformity and coaxial alignment. Bearing block 67 has front and rear extremities 31 and 32 respectively, said front extremity 31 fixedly associated with a front support shaft 33, said rear extremity fixedly associated with a rear support shaft 34, said shafts being cylindrical, coaxial, and perpendicular to the axis of bore 30. Shaft 34 is journaled to the engine block by way of main bearing 13. The shafts have proximal extremities 35 and 36 and distal extremities 37 and 38. Proximal extremities 35 and 36 are fixedly associated with said front and rear extremities, respectively, of bearing block 67. Both distal extremities 37 and 38 extend outwardly from crankcase 15. In the embodiment of FIG. 1, distal extremities 37 and 38 are adapted by means of machined threads to accept positioning means in the form of knurled and threaded knobs, 60 and 61, respectively.

A side support plate 39 has flat front and rear surfaces 40 and 41 respectively, and a circular opening 42 communicating between said front and rear surfaces. Rear surface 41 is adapted to abut against the gasket-receiving surface 16 of the crankcase. Clamping means in the form of split flange 43 having tightening screw 59 is attached to front surface 40. The clamping means has a circular opening 44 coaxial and condiametrical with circular opening 42, both openings accommodating shaft 33. Clamping means 43 secures front shaft 33 when tightened by means of allen screw 59, thereby preventing movement of the shaft and bearing block 67. Transverse relief slot 64 partially penetrates the diameter of clamping means 43 and longitudinal relief slot 65 penetrates the wall of clamping means 43 in order to facilitate clamping.

Figure 6:
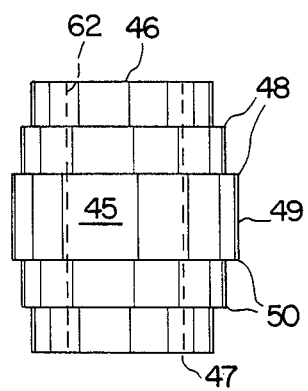
FIG. 6 is a side view of an alternative embodiment of the centering plug component of the device of FIG. 1.

Centering plug 45 has upper and lower surfaces 46 and 47 respectively, and an annular abutment shoulder 48 upwardly recessed from said lower surface 47, thereby defining upper and lower cylindric sectors 49 and 50, respectively. Upper sector 49 extends upwardly from shoulder 48 to upper surface 46. Lower sector 50 extend downwardly from shoulder 48 to lower surface 47. The lower sector is adapted for insertion into cylinder 12 in close circumferential conformity with the walls of the cylinder. Abutment shoulder 48 is adapted to define a lower limit of insertion upon contact with said deck 11. Upper sector 49 seats within circular aperture 20 of alignment plate 17 in close circumferential conformity, and thereby coaxially aligns circular aperture 20 and boring bar 25 with cylinder 12. In the illustrated embodiment, centered cylindrical bore 62 communicates between upper surface 46 and lower surface 47, and receives close-fitting alignment shaft 63. In alternative embodiments, as shown in FIG. 6, centering plug 45 may be comprised of a number of stepped concentric shoulders adapted to fit different sized cylinders.

Cutting means 51 has upper and lower surfaces 52 and 53 respectively, and a centered circular hole 54 communicating between said upper and lower surfaces. Hole 54 is adapted to accept said boring bar 25 in close conformity. Cutting means 51 has a circular perimeter concentric to hole 54, and a cutting blade 55 adapted to cut the cylinder wall in a rotational spiral manner. Cutting means 51 has attachment means in the form of transversely directed allen screw 56 adapted to abut against boring bar 25 and thereby maintain a fixed relationship with the boring bar.

In using the apparatus of this invention to re-bore a single cylinder 12 of an internal combustion engine, a centering plug 45 is selected which will make close fitting insertive engagement with the open extremity of the cylinder. The centering plug is inserted into the cylinder, as shown in FIG. 1, until its abutment shoulder 48 contacts the deck 11 of the engine.

Alignment plate 17 is then centered around the centering plug, and secured to cylinder head bolt holes 14 within deck 11.

Lower support assembly 29 is installed, making use of the crankshaft bearing 13 of the engine, and is loosely positioned by manipulation of opposed threaded knobs 60 and 61. Side plate 39 is bolted to gasket-receiving surface 16. Alignment shaft 63 is then inserted through the centering plug and through bearing block 67 held by said lower support assembly, and knobs 60 and 61 are tightened. The alignment shaft and centering plug are then removed.

Figure 2:
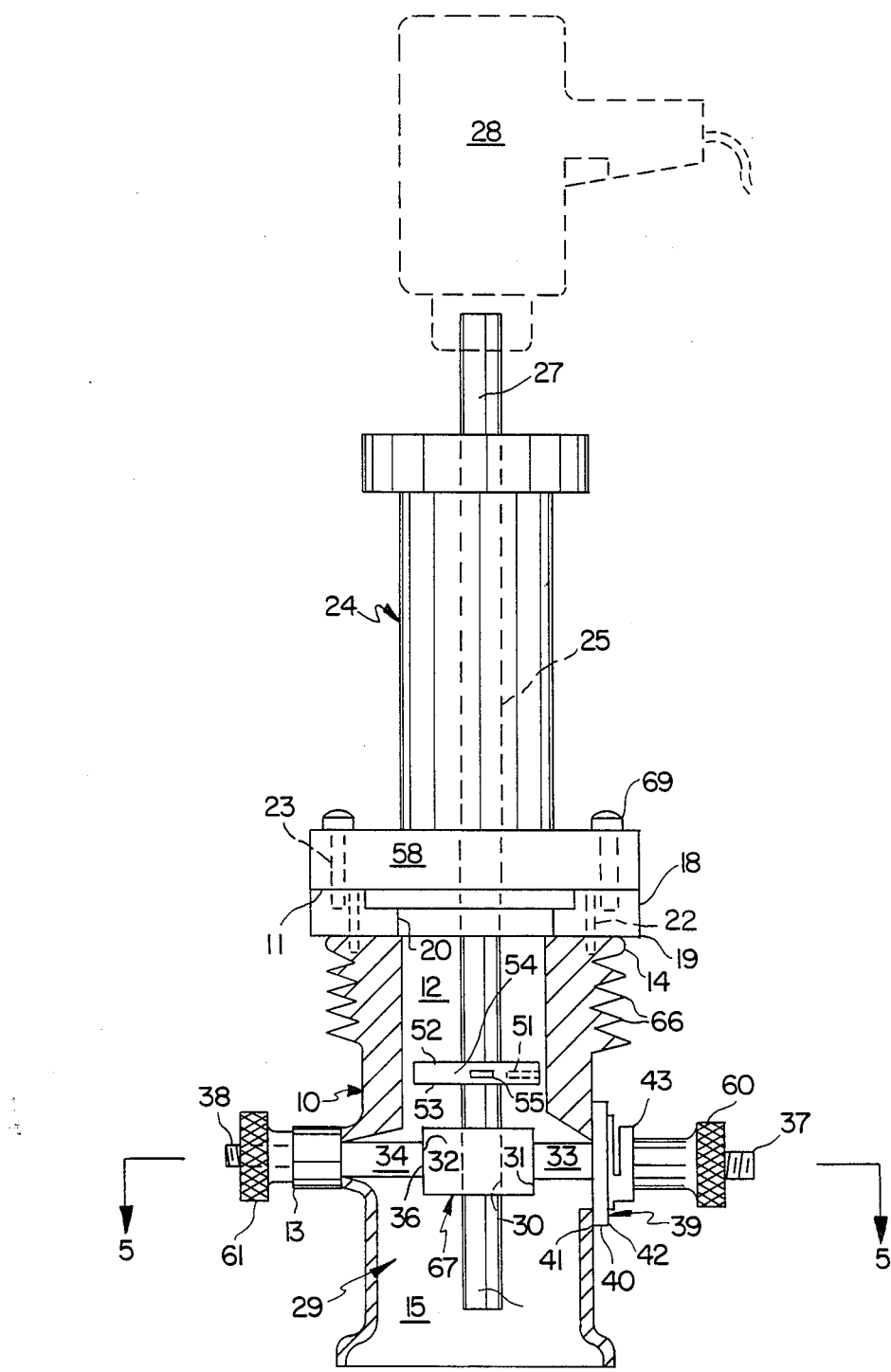
FIG. 2 is a side view of an embodiment of the present invention with said centering plug and alignment shaft components removed, and said boring means in place.
Figure 3:
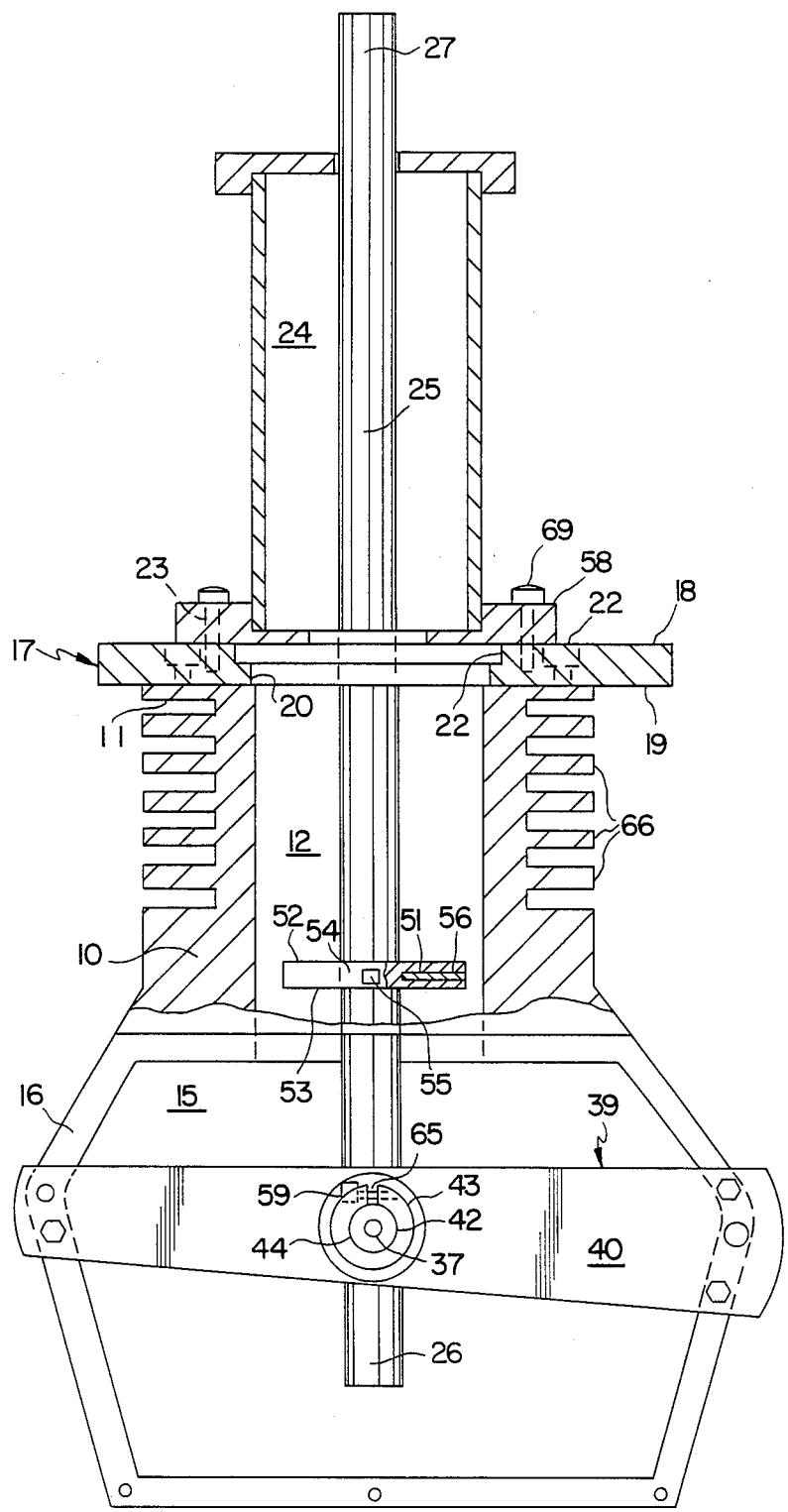
FIG. 3 is a front view of the embodiment of FIG. 2, shown partly in section.
Figure 4:
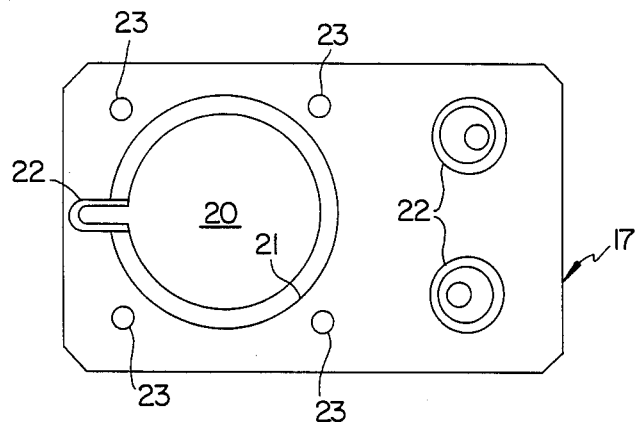
FIG. 4 is a plan view of the alignment plate utilized in the embodiment of FIG. 1.
Figure 5:
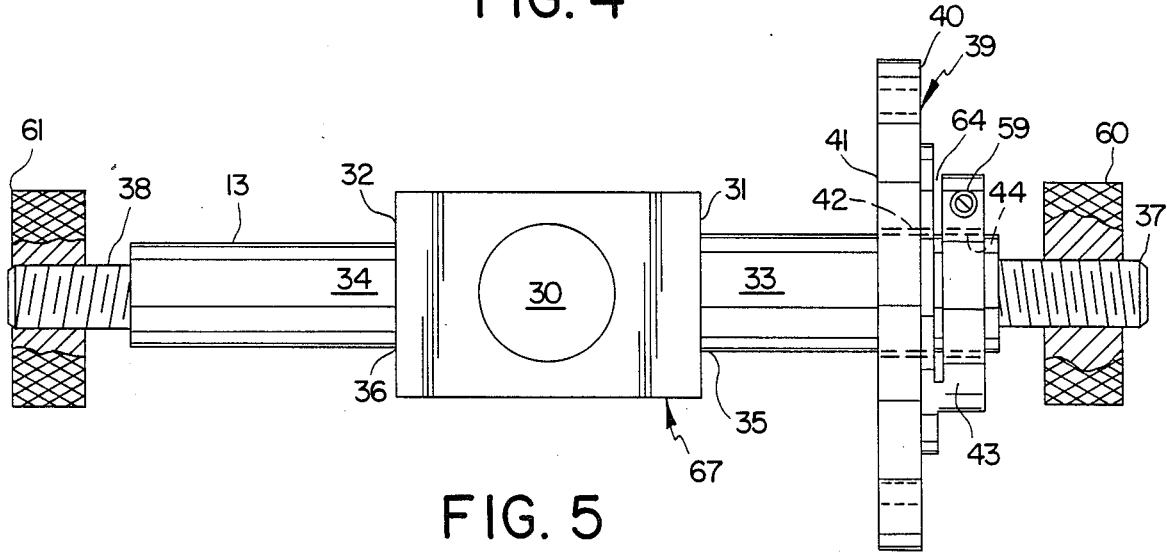
FIG. 5 is a plan view of a lower support assembly as may be utilized in the embodiment of FIG. 1.

Cutting means 51 is positioned at a site upon boring bar 25 so that the distance between said site and the lower extremity of the boring bar is greater than the length of the cylinder. The boring bar, attached to boring head means 24, is inserted into the cylinder so that the lower extremity of the boring bar penetratse bearing block 67, as shown in FIG. 2. The boring head means is secured to alignment plate 17 by studs 23 and nuts 69.

The wall of the cylinder is treated with a cutting oil, and rotation of boring bar 25 is begun by motorized means 28. During rotation of the boring bar with attached cutting means 51, the boring bar is axially lowered and raised until proper cutting of the cylinder wall is accomplished. The various components of the apparatus are then removed substantially by reversing the order in which they were emplaced.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An engine cylinder reboring apparatus adapted for use on a conventional piston driven internal combustion engine having a block, deck, cylinder, crankshaft bearing, cylinder head bolt holes, crankcase and crankcase gasket surface, said apparatus comprising:
   (a) an alignment plate having upper and lower surfaces and a circular aperture communicating between said upper and lower surfaces and having counterbored holes and head attachment means spaced about said aperture, said alignment plate being adapted for attachment to said deck in a manner disposing said aperture in coaxial alignment with said cylinder,
   (b) boring head means having a centered rotatable cylindrical bar in coaxial alignment with said circular aperture, said bar having lower and upper extremities, said lower extremity disposed below said aperture, said upper extremity being associated with means for rotating and downwardly advancing said bar, said boring head means being positioned by engagement with said head attachment means,
   (c) a lower support assembly comprising:
      (1) a bearing block having front and rear extremities and a bore adapted to rotatively secure said bar adjacent its lower extremity,
      (2) front and rear cylindrical support shafts fixedly held by said front and rear extremities, respectively, said shafts being perpendicularly disposed to the axis of said bore and having distal extremities provided with lateral positioning means, the distal extremity of said rear shaft being adapted to penetrate said crankshaft being in close-fitting engagement therewith, and
      (3) a side support plate having front and rear surfaces and a circular opening permitting close-fitting passage of said front shaft, said rear surface being flat and adapted to abut against the gasket-receiving surface of the crankshaft, and clamping means associated with said front surface for securing said front shaft and thereby preventing movement of said bearing block,
   (d) a circular centering plug having a centered cylindrical channel, upper and lower surfaces and at least one inwardly recessed annular abutment shoulder defining a coaxial cylindric sectors having different diameters, a first of said sectors being adapted for insertion into said cylinder in close circumferential conformity with the wall of the cylinder, the associated abutment shoulder being adapted to define a lower limit of insertion upon contact with said deck, and a second sector disposed above said first sector and of larger diameter and adapted to accept the circular aperture of said alignment plate in close circumferential conformity, thereby coaxially aligning said circular aperture and engine cylinder,
   (e) an alignment shaft adapted to extend in close-fitting passage through the channel of said centering plug and the bore of said bearing block,
   (f) said centering plug and alignment shaft being removable following completion of their aligning function, and
   (g) cutting means extending radially from said boring bar and axially positionable thereupon, and adapted to cut the cylinder wall in a rotational spiral manner.

2. The apparatus of claim 1 wherein said alignment plate is adapted to be associated with the deck by means of eccentric washers disposed within said counterbored holes.

3. The apparatus of claim 1 wherein said boring head means has means for raising and lowering said bar independently of rotational movement of said bar.

4. The apparatus of claim 1 wherein said lateral positioning means is threaded.

5. The apparatus of claim 1 wherein said cnetering plug is comprised of a number of cylindrical sectors, thereby adapting the plug for usage in cylinders of various diameters.

6. The apparatus of claim 1 wherein said head attachment means are threaded posts upwardly directed from said alignment plate.

* * * * *